United States Patent [19]
Schadel

[11] Patent Number: 5,702,558
[45] Date of Patent: Dec. 30, 1997

[54] METHOD OF TOP-COATING A VENEERED SUBSTRATE

[75] Inventor: Richard J. Schadel, Coloma, Mich.

[73] Assignee: Atlantic Automotive Components, Inc., Benton Harbor, Mich.

[21] Appl. No.: 672,699

[22] Filed: Jun. 27, 1996

[51] Int. Cl.$^6$ .......................... B32B 21/14; B32B 31/20; B32B 31/00

[52] U.S. Cl. .............. 156/323; 156/289; 156/306.9; 428/106; 428/142; 428/412

[58] Field of Search .................. 156/323, 288, 156/289, 306.6, 306.9; 428/106, 142, 151, 412, 541

[56] References Cited

U.S. PATENT DOCUMENTS

| | | | |
|---|---|---|---|
| 3,770,536 | 11/1973 | Haigh | 156/323 |
| 3,936,551 | 2/1976 | Elmendorf | 428/106 |
| 4,256,798 | 3/1981 | Witt | 156/288 |
| 5,085,921 | 2/1992 | Jayarajan | 156/288 |
| 5,423,933 | 6/1995 | Horian | 156/309.6 |

*Primary Examiner*—Daniel Stemmer
*Attorney, Agent, or Firm*—Brooks & Kushman P.C.

[57] ABSTRACT

A method is provided for top-coating a veneered substrate. Heat-activated urethane adhesive layers are placed on opposing sides of a veneered substrate, and Lexan films of equal thickness are placed adjacent the two layers of adhesive. A polyethylene sheet is placed adjacent each Lexan film to act as a release masking. A silicone pad is laid on the lower platen, and a 5 mil polycarbonate sheet is placed on top of the stack for contacting the top platen of the laminating press. The laminating press then applies heat and pressure for a predetermined period of time to produce a hard-coated veneered substrate, and the polyethylene sheets are discarded.

16 Claims, 2 Drawing Sheets

METHOD OF TOP-COATING A VENEERED SUBSTRATE

TECHNICAL FIELD

The present invention relates to wood veneer, and more particularly to a method of top-coating a veneered substrate.

BACKGROUND ART

Veneered substrates are commonly used in various applications, such as in the boating industry, furniture industry, department stores, etc. Where abrasive conditions exist or where durability and impact resistance is important, a veneered substrate is required to have a scratch-resistant hard coating which protects the veneer while providing an aesthetically pleasing surface appearance.

Typically, the veneer is applied to a substrate, such as particle board, by means of adhesive, and multiple layers of an atomized sprayable top coat are applied to provide the required durability and scratch-resistance. This top coat is typically a cross-linking polyester, or a two component polyester. This sprayable top coat must be applied sometimes up to 15 coats, while allowing 15-20 minutes of drying time between applications, as well as requiring substantial polishing after the polyester top coat is applied. This process is extremely time-consuming and results in an expensive manufacturing process. Furthermore, the two component polyester top coat is an environmentally harmful chemical and any residuals left over after the spraying operation must be filtered or incinerated for environmental protection. These operations add further cost to the manufacturing process.

It is desirable to provide a method of top-coating a veneered substrate in a manner which does not require numerous applications of a sprayable top coat. It is further desirable to provide a method of top coating a veneered substrate in a manner in which environmentally damaging top-coating materials are not used. It is also desirable to provide a method of top-coating a veneered substrate in which manufacturing time is reduced.

DISCLOSURE OF THE INVENTION

The present invention overcomes the above-referenced shortcomings of prior art methods of top-coating a veneered substrate by providing a method which comprises applying polycarbonate sheets to opposing sides of a veneered substrate by means of a urethane adhesive placed therebetween. A coextruded nylon/polyethylene sheet is placed against each polycarbonate sheet to act as a release masking for absorbing lint and debris which would otherwise be absorbed by the polycarbonate. A silicone pad is laid on the bottom platen of the laminating press, and a third polycarbonate sheet is positioned between the top platen and the outer coextruded polyethylene sheet to prevent sticking. Heat and pressure are applied for approximately 5 to 10 hours, and the polyethylene sheets are discarded. In this manner, no environmentally harmful sprayable top coat is applied, and no repeated coating or polishing is required. Furthermore, less expensive manufacturing equipment can be used because the paint line and buffing equipment are replaced by an inexpensive laminating press, and fewer manufacturing steps are required.

More specifically, the present invention provides a method of top coating a veneered substrate, comprising the following steps: 1) laying a silicone pad on the bottom platen of a laminating press; 2) laying a first release masking sheet on the pad; 3) laying a first polycarbonate sheet on the first release masking sheet; 4) laying a first urethane adhesive sheet on the first polycarbonate sheet; 5) laying the veneered substrate on the first urethane adhesive sheet; 6) laying a second urethane adhesive sheet on the veneered substrate; 7) laying a second polycarbonate sheet on the second adhesive sheet; 8) laying a second release masking sheet on the second polycarbonate sheet; 9) laying a third polycarbonate sheet on the second release masking sheet; and 10) applying heat and pressure for a predetermined period of time to adhesively secure the first and second polycarbonate sheets to the veneered substrate.

In preferred embodiments, the release masking sheets comprise of 1 mil of nylon coextruded with 2 mil of polyethylene, approximately 3 mil in total thickness, the polycarbonate sheets comprise Lexan sheets at least 30 mil thick; and the third polycarbonate sheet comprises a Lexan sheet approximately 4 mil thick. In the preferred embodiment, the lamination press is set at a pressure of 140–165 Bar; a temperature of 115°–130° C.; and the cycle time is approximately 5 to 10 hours.

Accordingly, an object of the present invention is to provide a method of top-coating a veneered substrate in a manner in which manufacturing costs are reduced and cycling time is reduced.

A further object of the present invention is to provide a method of top-coating a veneered substrate which does not require the use of environmentally harmful sprayable top coats.

The above objects and other objects, features, and advantages of the present invention are readily apparent from the following detailed description of the best modes for carrying out the invention when taken in connection with the accompanying drawings.

DETAILED DESCRIPTION OF THE PREFERRED EMBODIMENT

Figure 1:
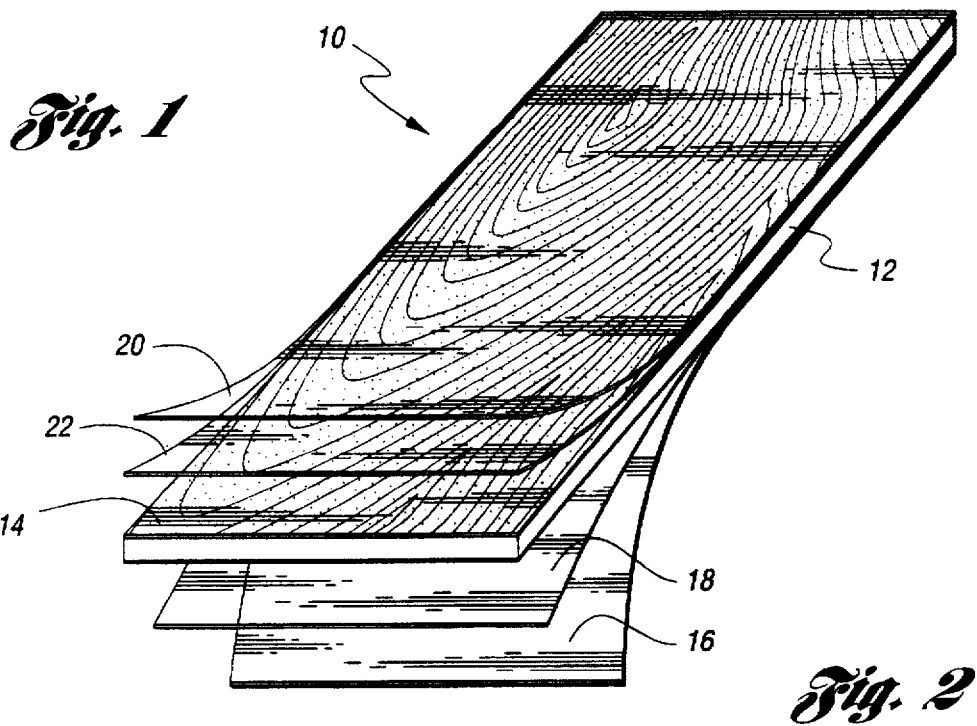
FIG. 1 shows a partially exploded perspective view of a veneered substrate coated with a Lexan film in accordance with the present invention.

FIG. 1 shows a top-coated veneered substrate 10 in accordance with the present invention. The top-coated veneered substrate 10 includes a base substrate 12, which is preferably a fiberboard, plywood, or other base substrate material. A veneer sheet 14 is adhesively secured to the top surface of the base substrate 12. A Lexan film 16 coated with silica oxide for scratch resistance is adhesively secured to the veneered substrate by an adhesive layer 18. The Lexan film 16 is preferably a highly polished polycarbonate having 98% reflectivity at a 60 degree angle. The silicon oxide hard coating is previously sprayed on the polycarbonate film and baked at 275° F. for 30 minutes to cure the hard coating, or can be a UV curable style hard coating. The hard coating is approximately 1/10,000 of an inch in thickness, and the Lexan is preferably 30 mil in thickness, but may be up to 1/8 inch thick.

The adhesive layer 18 comprises a heat-activated film adhesive, such as a polyurethane/polyether combination containing UV fade-resistant monomers. The urethane adhesive layer 18 is matted on one side to avoid a suction cup affect when extruding. Preferably, the matted side is oriented facing the Lexan film 16 for allowing air to escape. The urethane adhesive layer 18 is preferably approximately 15 mil thick. A urethane adhesive sold under Part No. A-4100NAT by Deerfield, Inc. is preferred. A second Lexan film 20 is applied to the bottom surface of the veneered substrate 12 by means of a second adhesive layer 22, identical to the first adhesive layer 18. The second Lexan film 20 is of equal thickness to the first adhesive layer 18 to prevent bowing of the substrate 12. The second Lexan film 20 need not be hard-coated. Because the two Lexan film layers 16,20 are of equal thickness, their shrinkage rates will be equal, thereby avoiding warpage of the base substrate 12.

Figure 2:
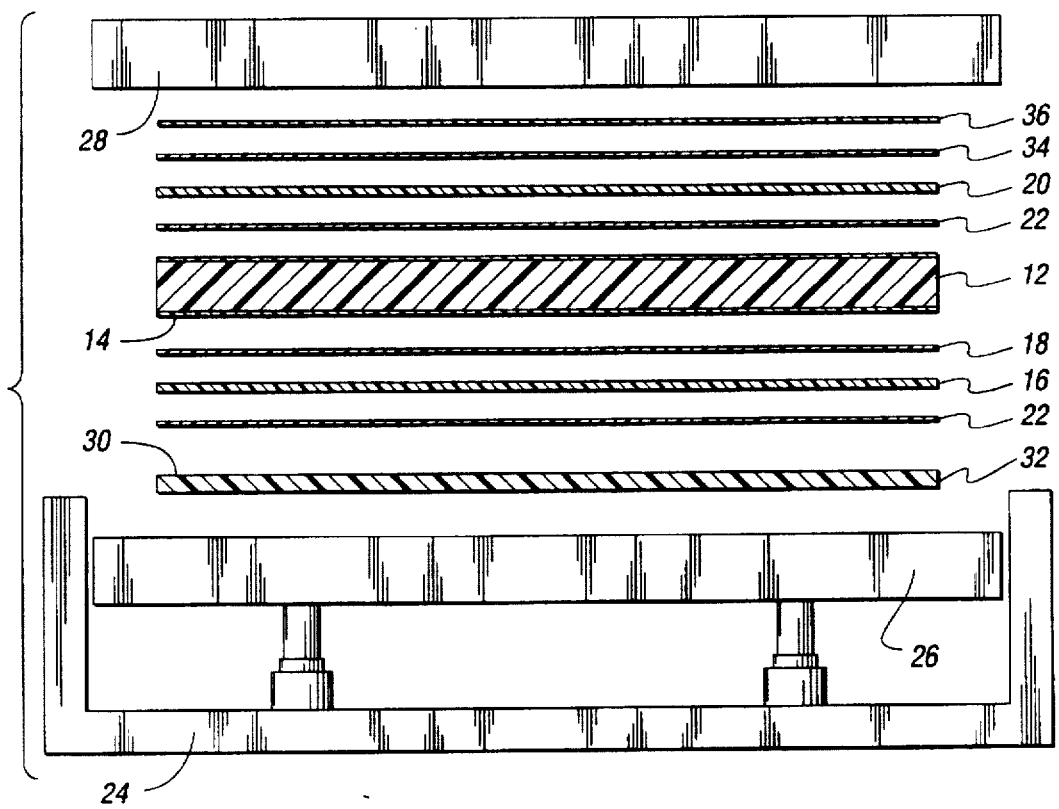
FIG. 2 shows an exploded side view of a laminating press and the components necessary for producing a top-coated veneered substrate in accordance with the present invention.
Figure 3:
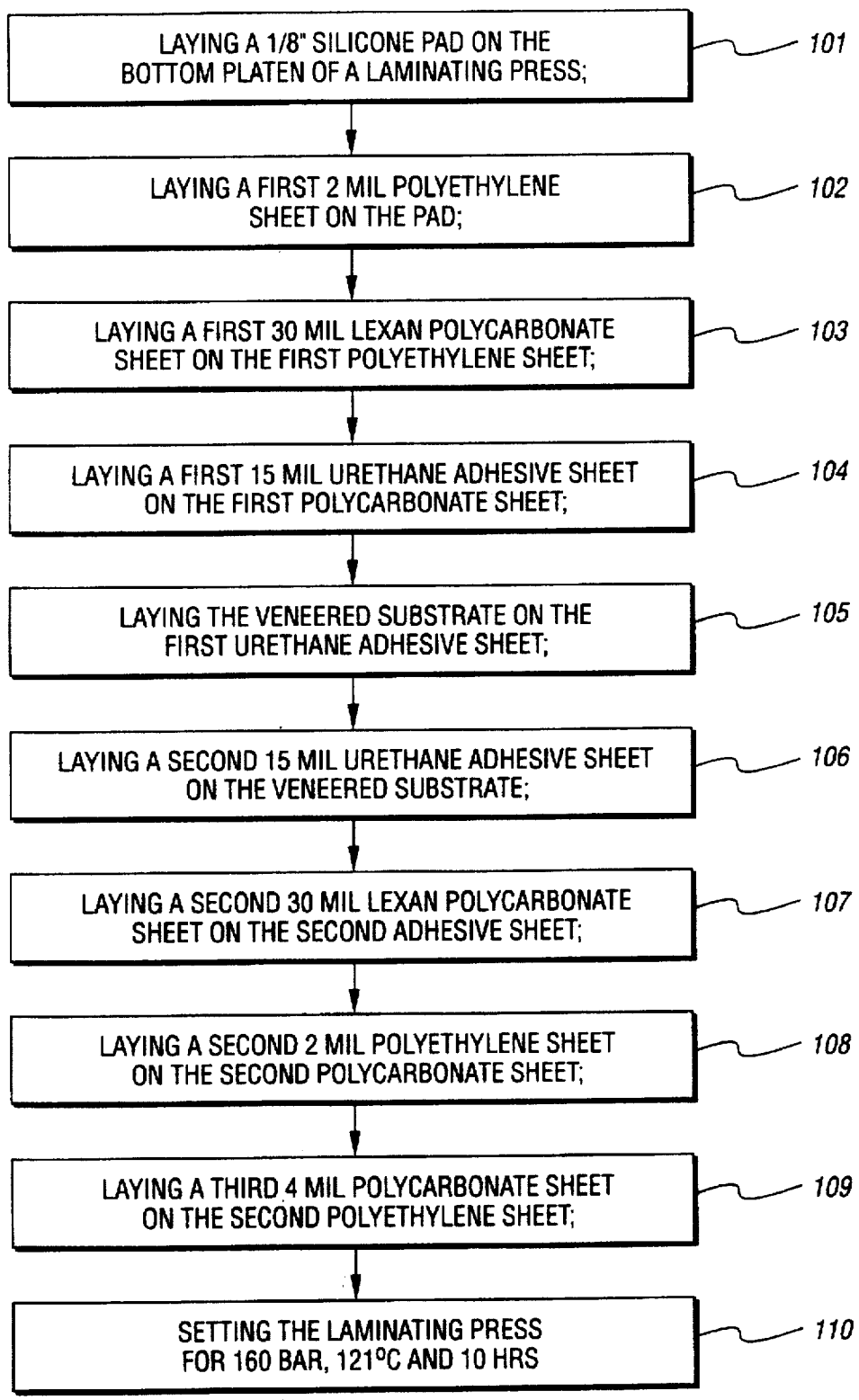
FIG. 3 shows a schematic flow diagram of the method steps in accordance with the present invention.

The method of making the top-coated veneered substrate 10 is more clearly described with reference to FIGS. 2–3. FIG. 2 illustrates a laminating press 24 including a lower platen 26 and an upper platen 28. The first step of the process (step 101 of FIG. 3) comprises laying a ⅛ inch silicone pad 30 on the lower platen 26. The next step (step 102) comprises laying a 2 mil polyethylene sheet 32 on the silicone pad 30. The polyethylene sheet 32 is used as a protective release masking and is disposable. The polyethylene sheet 32 absorbs lint and debris which would otherwise be absorbed by the polycarbonate layer 16, and is disposable.

Step 103 comprises laying a first Lexan polycarbonate sheet 16 on the first polyethylene sheet 32. As previously mentioned, the Lexan sheet 16 is preferably 30 mil to ⅛ inch in thickness. The Lexan sheet 16 is placed adjacent the polyethylene sheet 32 and does not contain a hard coated side. Step 104 comprises laying a first urethane adhesive sheet 18 on the Lexan film 16. The urethane adhesive sheet 18 is preferably 10–30 mil in thickness. Step 105 comprises laying the veneered substrate 12 on the first urethane adhesive sheet 18, with the wood veneer 14 contacting the adhesive layer 18.

Step 106 comprises laying a second urethane adhesive sheet 22 on the veneered substrate 12. Step 107 comprises laying a second Lexan sheet 20 with the silica oxide hard coating being placed away from the adhesive 22. The second Lexan sheet 20 is of equal thickness as the first Lexan sheet 16. Step 108 comprises laying a second polyethylene sheet 34 on the second polycarbonate sheet 20. The second polyethylene sheet 34 acts as a release masking for absorbing debris and lint from the second polycarbonate sheet 20. The second polyethylene sheet 34 is disposable.

Step 109 comprises laying a third polycarbonate sheet 36 on the second polyethylene sheet 34. The third polycarbonate sheet is preferably a 4 mil thick smooth Lexan sheet. This Lexan sheet is used as a release masking between the polyethylene 34 and the upper platen 28 so the polyethylene 34 does not stick to the upper platen 28.

Step 110 comprises applying a pressure of 140–160 Bar and a temperature of 115°–130° C. for approximately 5 to 10 hours. The veneered substrate 12 is then removed, and the first and second polyethylene sheets 32,34 are disposed of.

In another embodiment, it is possible to stack several such substrate layers in a laminating press. The size of the veneered substrate is limited only by the size of the press.

This process is particularly applicable for use in table tops, kitchen cabinets, plaques, displays, etc. Reverse printing could be applied to the Lexan sheet for manufacturing of plaques.

While the best mode for carrying out the invention has been described in detail, those familiar with the art to which this invention relates will recognize various alternative designs and embodiments for practicing the invention within the scope of the appended claims.

What is claimed is:

1. A method of top-coating a veneered substrate, comprising:
   laying a pad on the bottom platen of a laminating press;
   laying a first release masking sheet on the pad;
   laying a first polycarbonate sheet on the first release masking sheet;
   laying a first urethane adhesive sheet on the first polycarbonate sheet;
   laying the veneered substrate on the first urethane adhesive sheet;
   laying a second urethane adhesive sheet on the veneered substrate;
   laying a second polycarbonate sheet on the second adhesive sheet;
   laying a second release masking sheet on the second polycarbonate sheet;
   laying a third polycarbonate sheet on the second release masking sheet; and
   applying heat and pressure for a predetermined period of time to adhesively secure the first and second polycarbonate sheets to the veneered substrate.

2. The method of claim 1, wherein said step of laying a pad on the bottom platen comprises laying a silicone pad on the bottom platen.

3. The method of claim 1, wherein said step of laying first and second release masking sheets comprise laying first and second polyethylene sheets.

4. The method of claim 3, wherein said steps of laying first and second polyethylene sheets comprise laying first and second polyethylene sheets having a thickness of approximately 2 mil.

5. The method of claim 1, wherein said steps of laying first and second polycarbonate sheets comprise laying first and second polycarbonate sheets having a thickness of at least approximately 30 mil.

6. The method of claim 1, wherein said steps of laying first and second urethane adhesive sheets comprise laying urethane adhesive sheets having a thickness of approximately 15 mil and containing ultraviolet light blockers.

7. The method of claim 1, wherein said step of laying a third polycarbonate sheet on the second release masking sheet comprises laying a polycarbonate sheet having a thickness between 2 mil and 50 mil.

8. The method of claim 1, wherein said step of applying heat and pressure for a predetermined period of time comprises applying between 140 and 165 Bar pressure and between 115° and 130° C. heat for approximately 10 hours.

9. The method of claim 1, wherein said steps of laying first and second polycarbonate sheets comprise laying a first hard-coated polycarbonate sheet and a second non-hard-coated polycarbonate sheet.

10. A method of top-coating a veneered substrate, comprising:
   laying a silicone pad on the bottom platen of a laminating press;
   laying a first polyethylene sheet on the silicone pad;
   laying a first polycarbonate sheet on the first polyethylene sheet;
   laying a first urethane adhesive sheet on the first polycarbonate sheet;
   laying a veneered substrate on the first urethane adhesive sheet;

laying a second urethane adhesive sheet on the veneered substrate;

laying a second polycarbonate sheet on the second urethane adhesive sheet;

laying a second polyethylene sheet on the second polycarbonate sheet;

laying a third polycarbonate sheet on the second polyethylene sheet; and applying heat and pressure for a predetermined period of time to adhesively secure the first and second polycarbonate sheets to the veneered substrate.

11. The method of claim 10, wherein said steps of laying first and second polyethylene sheets comprise laying first and second polyethylene sheets having a thickness of approximately 2 mil.

12. The method of claim 10, wherein said steps of laying first and second polycarbonate sheets comprise laying first and second polycarbonate sheets having a thickness of at least approximately 30 mil.

13. The method of claim 10, wherein said steps of laying first and second urethane adhesive sheets comprise laying urethane adhesive sheets having a thickness of approximately 15 mil and containing ultraviolet light blockers.

14. The method of claim 10, wherein said step of laying a third polycarbonate sheet on the second polyethylene sheet comprises laying a polycarbonate sheet having a thickness between 2 mil and 50 mil.

15. The method of claim 10, wherein said step of applying heat and pressure for a predetermined period of time comprises applying between 140 and 165 Bar pressure and between 115° and 130° C. heat for approximately 10 hours.

16. The method of claim 10, wherein said steps of laying first and second polycarbonate sheets comprise laying a first hard-coated polycarbonate sheet and a second non-hard-coated polycarbonate sheet.

* * * * *